(12) United States Patent
Yen et al.

(10) Patent No.: US 11,034,221 B2
(45) Date of Patent: Jun. 15, 2021

(54) RETRACTABLE AERODYNAMIC PANEL

(71) Applicant: GM Global Technology Operations LLC, Detroit, MI (US)

(72) Inventors: Chih-hung Yen, Bloomfield, MI (US); Taeyoung Han, Bloomfield, MI (US); Wonhee Kim, Royal Oak, MI (US); Kuo-huey Chen, Troy, MI (US); Bahram Khalighi, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 67 days.

(21) Appl. No.: 16/576,376

(22) Filed: Sep. 19, 2019

(65) Prior Publication Data
US 2021/0086597 A1    Mar. 25, 2021

(51) Int. Cl.
*B60J 7/06*        (2006.01)

(52) U.S. Cl.
CPC .............. *B60J 7/064* (2013.01); *B60J 7/067* (2013.01)

(58) Field of Classification Search
CPC ........... B60J 7/064; B60J 7/067; B62D 35/00; B62D 37/02; B62D 33/03
USPC ............................................. 296/180.1, 57.1
See application file for complete search history.

(56) References Cited

U.S. PATENT DOCUMENTS

| | | | |
|---|---|---|---|
| 5,320,397 A * | 6/1994 | Peterson ............ | B62D 33/0273 296/180.1 |
| 7,878,576 B1 * | 2/2011 | Embler .............. | B62D 33/0273 296/180.1 |
| 10,399,615 B2 * | 9/2019 | Williams ............. | B62D 35/007 |
| 2008/0030049 A1 * | 2/2008 | Cooper ................ | B62D 35/007 296/180.1 |
| 2017/0101138 A1 * | 4/2017 | Povinelli ................ | B62D 33/03 |

* cited by examiner

*Primary Examiner* — Joseph D. Pape

(57) ABSTRACT

A retractable aerodynamic panel for an automotive truck cargo bed comprises a first support rail adapted to be mounted onto a top edge of a first side wall of an automotive truck bed and a second support rail adapted to be mounted onto a top edge of a second side wall of an automotive truck cargo bed, a panel adapted to be mounted onto a tailgate of the automotive truck cargo bed, the panel adapted to extend between a retracted position, wherein the automotive truck cargo bed is substantially open, and a deployed position, wherein the panel extends outward from the tailgate across a portion of the automotive truck cargo bed between the top edges of the first and second side walls, the panel supported between side walls within the support rails, and an actuator adapted to selectively extend the panel between the retracted and deployed positions.

19 Claims, 5 Drawing Sheets

RETRACTABLE AERODYNAMIC PANEL

INTRODUCTION

The present disclosure relates to a retractable and rigidizable aerodynamic panel for the cargo bed of an automotive truck.

A fixed flat panel mounted over the cargo bed of a pick-up truck reduces aerodynamic drag caused by the cargo bed, however, such a panel prevents use of the cargo bed to haul payload. Reduced aerodynamic drag will improve the fuel economy of the truck as well as decreasing emissions and $CO2$ footprint.

Thus, while current cargo bed covers achieve their intended purpose, there is a need for a retractable aerodynamic panel that can be retracted to allow use of the cargo bed, and can be deployed to cover all or a portion of the cargo bed to provide improved aerodynamic performance of the truck.

SUMMARY

According to several aspects, a retractable aerodynamic panel for an automotive truck cargo bed, comprises a first support rail adapted to be mounted onto a top edge of a first side wall of an automotive truck cargo bed and a second support rail adapted to be mounted onto a top edge of a second side wall of an automotive truck cargo bed, a panel adapted to be mounted onto a tailgate of the automotive truck cargo bed, the panel adapted to extend between a retracted position, wherein the automotive truck cargo bed is substantially open, and a deployed position, wherein the panel extends outward from the tailgate across a portion of the automotive truck cargo bed between the top edges of the first and second side walls, the panel being supported between the first and second side walls within the first and second support rails, and an actuator adapted to selectively extend the panel between the retracted and deployed positions.

According to another aspect, when the panel is in the deployed position, the panel extends a pre-determined distance from the tailgate to provide optimal aerodynamic drag reduction.

According to another aspect, the panel extends outward from the tailgate a distance that is roughly equal to the height of the tailgate.

According to another aspect, the panel comprises a first patterned layer, a second patterned layer, and a friction layer positioned between the first and second patterned layers, the first and second patterned layers and the friction layer contained within a vacuum bladder, wherein when negative pressure is selectively applied to the vacuum bladder, the first and second patterned layers are forced into frictional engagement with the friction layer and sliding movement of the first and second patterned layers relative to one another is substantially prevented, causing the panel to be substantially rigid.

According to another aspect, the panel comprises a plurality of patterned layers and a plurality of friction layers, one friction layer being positioned between each pair of adjacent patterned layers, the plurality of patterned layers and the plurality of friction layers contained within a vacuum bladder, wherein when negative pressure is applied to the vacuum bladder, the plurality of patterned layers are forced into frictional engagement with the plurality of friction layers and sliding movement of the patterned layers relative to one another is prevented, causing the panel to be substantially rigid.

According to another aspect, the panel is adapted to roll onto a spool when the panel is in the retracted position.

According to another aspect, the panel is adapted to fold up within a hollow interior of the tailgate when the panel is in the retracted position.

According to another aspect, the actuator includes at least one folding arm mechanism, the folding arm mechanism having a first arm and a second arm, a first distal end of the first arm being pivotally attached to the tailgate, a first distal end of the second arm being pivotally attached to a distal edge of the panel, the first and second arms being pivotally attached to one another at second distal ends respectively, wherein rotation of the first arm about the pivotal connection of the first arm to the tailgate moves the distal edge of the panel relative to the tailgate.

According to another aspect, the retractable aerodynamic panel further includes one of an electric motor and a linear actuator adapted to selectively rotate the first arm about the pivotal connection of the first arm to the tailgate, the linear actuator being one of a multistage threaded rod linear actuator and a pneumatic driven linear actuator.

According to another aspect, the retractable aerodynamic panel further includes a sensor mounted within the bed and a controller, the controller adapted to receive information from the sensor within the bed and to automatically extend the panel to the deployed position based on loading within the bed.

According to another aspect, the retractable aerodynamic panel further includes a controller, the controller adapted to receive input from an operator and to extend the panel to the deployed position based on input from the operator.

According to several aspects of the present disclosure, a retractable aerodynamic panel for an automotive truck cargo bed comprises a first support rail adapted to be mounted onto a top edge of a first side panel of an automotive truck bed and a second support rail adapted to be mounted onto a top edge of a second side panel of an automotive truck cargo bed, a panel adapted to be mounted onto a tailgate of the automotive truck cargo bed, the panel adapted to extend between a retracted position, wherein the panel is stowed within a hollow interior of the tailgate and the automotive truck bed is substantially open, and a deployed position, wherein the panel extends outward from the tailgate across a portion of the automotive truck bed between the top edges of the first and second side panels, the panel being supported between the first and second side panels within the first and second support rails, the panel including a first patterned layer, a second patterned layer, and a friction layer positioned between the first and second patterned layers, the first and second patterned layers and the friction layer contained within a vacuum bladder, wherein when a vacuum is selectively applied to the vacuum bladder, the first and second patterned layers are forced into frictional engagement with the friction layer and sliding movement of the first and second patterned layers relative to one another is prevented, causing the panel to be substantially rigid, an actuator including at least one folding arm mechanism, the folding arm mechanism having a first arm and a second arm, a first distal end of the first arm being pivotally attached to the tailgate, a first distal end of the second arm being pivotally attached to a distal edge of the panel, the first and second arms being pivotally attached to one another at second distal ends respectively, wherein rotation of the first arm about the pivotal connection of the first arm to the tailgate moves the distal edge of the panel relative to the tailgate to selectively extend the panel between the retracted and deployed positions, and a controller, the controller adapted to receive input from an operator and from sensors within the automotive truck cargo bed and to extend the panel to the deployed position based on the input received.

According to another aspect, when the panel is in the deployed position, the panel extends a pre-determined distance from the tailgate to provide optimal aerodynamic drag reduction.

According to another aspect, the panel extends outward from the tailgate a distance that is roughly equal to the height of the tailgate.

According to another aspect, the retractable aerodynamic panel further includes one of an electric motor and a linear actuator adapted to selectively rotate the first arm about the pivotal connection of the first arm to the tailgate, the linear actuator being one of a multi-stage threaded rod linear actuator and a pneumatic driven linear actuator.

According to several aspects of the present disclosure, a cargo bed for an automotive truck comprises a first side wall, a second side wall, a front wall, a bottom, and a tailgate, a first support rail mounted onto a top edge of the first side wall and a second support rail mounted onto a top edge of the second side wall, a panel mounted onto the tailgate, the panel adapted to extend between a retracted position, wherein the panel is stowed within a hollow interior of the tailgate and the automotive truck bed is substantially open, and a deployed position, wherein the panel extends outward from the tailgate across a portion of the automotive truck bed between the top edges of the first and second side walls, the panel being supported between the first and second side walls within the first and second support rails, the panel including a first patterned layer, a second patterned layer, and a friction layer positioned between the first and second patterned layers, the first and second patterned layers and the friction layer contained within a vacuum bladder, wherein when negative pressure is applied to the vacuum bladder, the first and second patterned layers are forced into frictional engagement with the friction layer and sliding movement of the first and second patterned layers relative to one another is substantially prevented, causing the panel to be substantially rigid, an actuator including at least one folding arm mechanism, the folding arm mechanism having a first arm and a second arm, a first distal end of the first arm being pivotally attached to the tailgate, a first distal end of the second arm being pivotally attached to a distal edge of the panel, the first and second arms being pivotally attached to one another at second distal ends respectively, wherein rotation of the first arm about the pivotal connection of the first arm to the tailgate moves the distal edge of the panel relative to the tailgate to selectively extend the panel between the retracted and deployed positions, and a controller, the controller adapted to receive input from an operator and from sensors within the automotive truck cargo bed and to extend the panel to the deployed position based on input received.

According to another aspect, when the panel is in the deployed position, the panel extends a pre-determined distance from the tailgate to provide optimal aerodynamic drag reduction.

According to another aspect, the panel extends outward from the tailgate a distance that is roughly equal to the height of the tailgate.

According to another aspect, the cargo bed for an automotive truck further includes one of an electric motor and a linear actuator adapted to selectively rotate the first arm about the pivotal connection of the first arm to the tailgate, wherein the linear actuator is one of a multi-stage threaded rod linear actuator and a pneumatic driven linear actuator.

According to another aspect, the cargo bed for an automotive truck further includes a sensor mounted within the bed and a controller, the controller adapted to receive information from the sensor within the bed and from an operator, and to automatically extend the panel to the deployed position based on loading within the bed and input from the operator.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
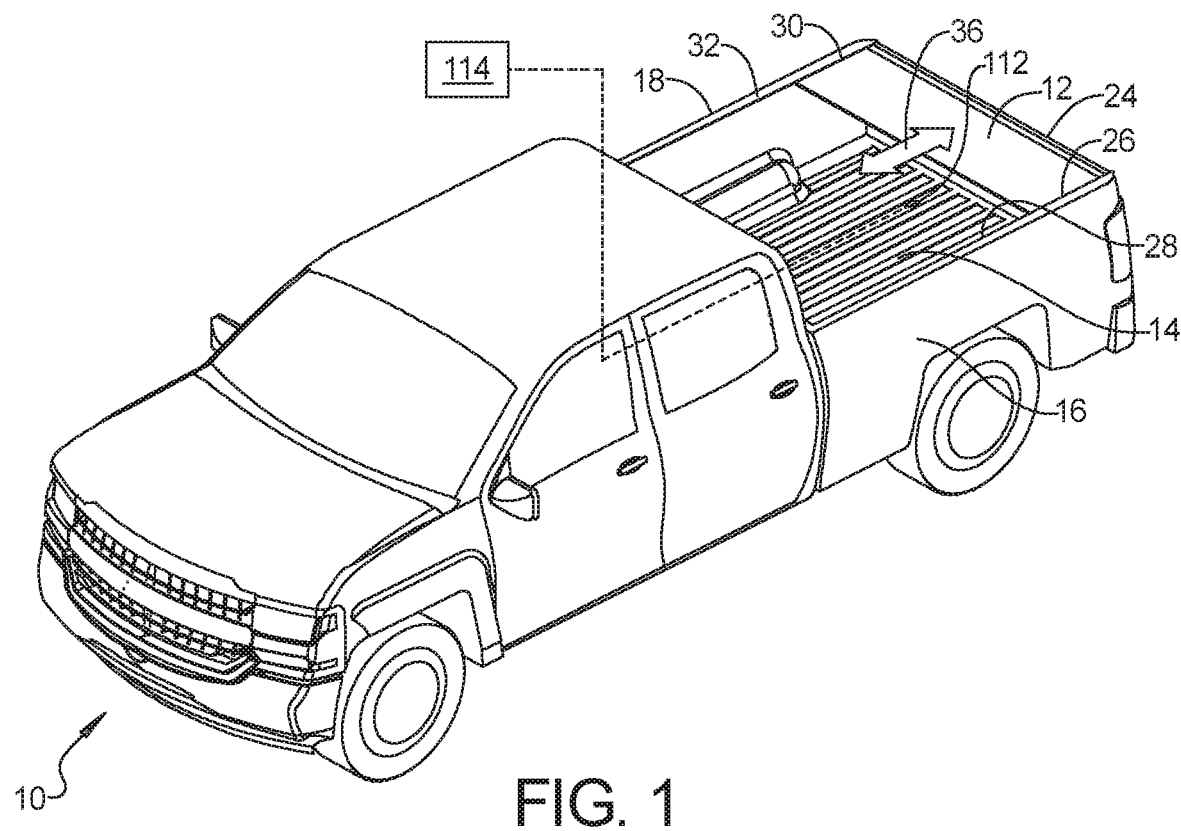
FIG. 1 is a perspective view of an automotive truck having an retractable aerodynamic panel according to an exemplary embodiment.

Referring to FIG. 1, an automotive truck 10 having a retractable aerodynamic panel 12 according to the present disclosure is shown. The truck 10 has a cargo bed 14 having a first side wall 16, a second side wall 18, a front wall 20, a bottom 22 and a tailgate 24.

Figure 2A:
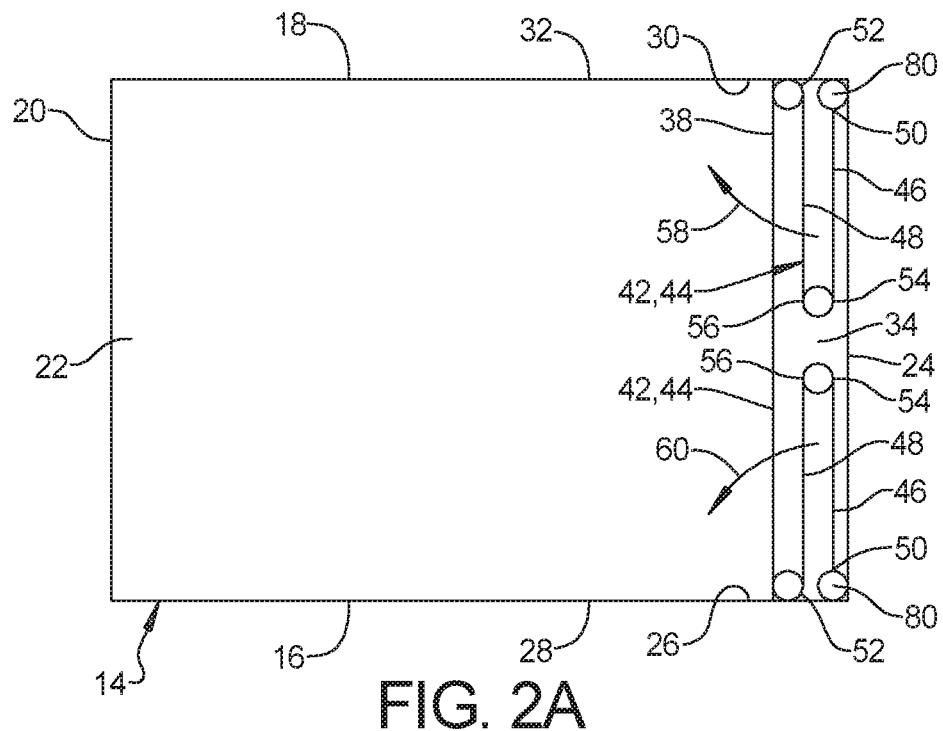
FIG. 2A is a schematic top view of an automotive truck bed having a retractable aerodynamic panel according to an exemplary embodiment, wherein the panel is in the retracted position.
Figure 2B:
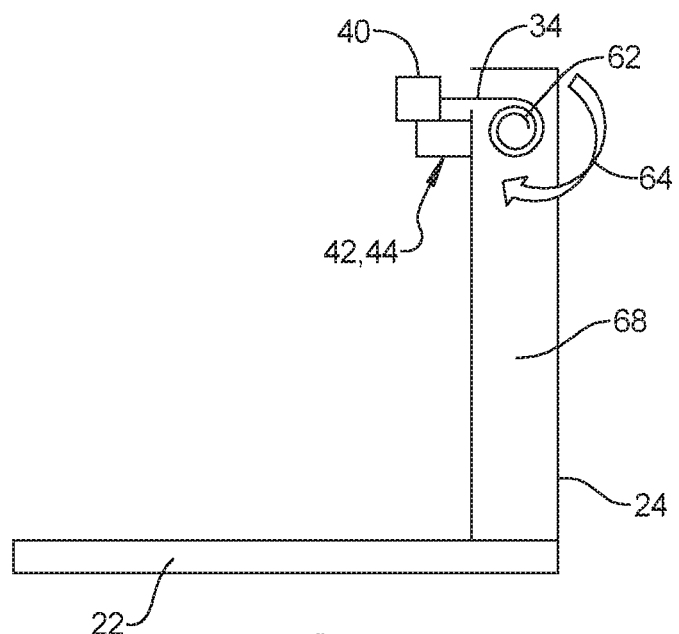
FIG. 2B is a schematic side view of the automotive truck bed having a retractable aerodynamic panel shown in FIG. 2A.
Figure 3A:
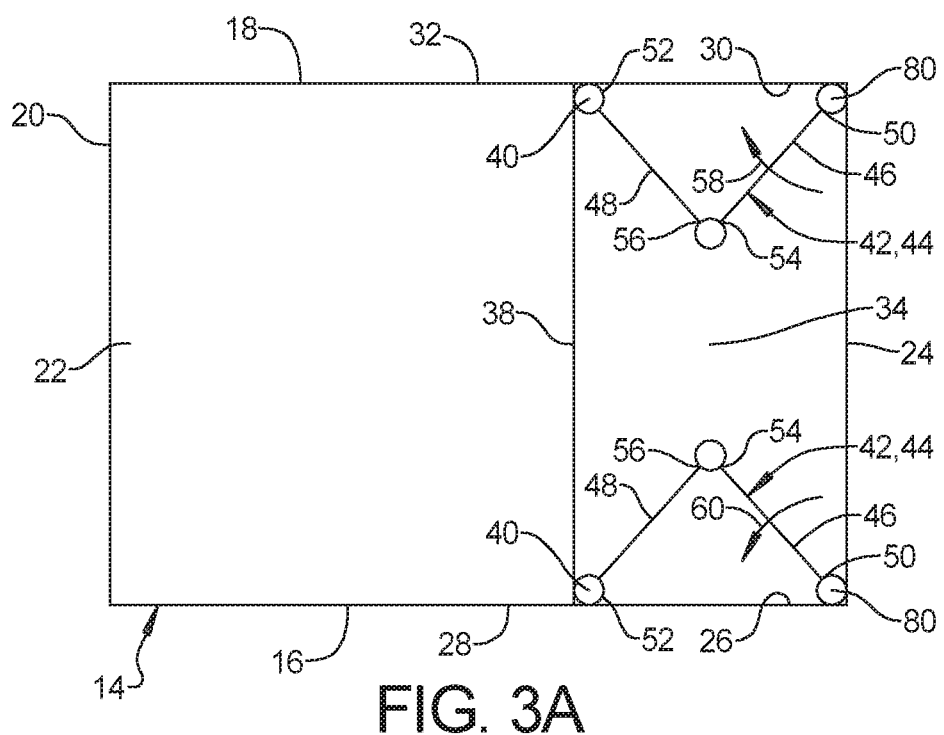
FIG. 3A is a schematic top view of an automotive truck bed having a retractable aerodynamic panel according to an exemplary embodiment, wherein the panel is in the deployed position.
Figure 3B:
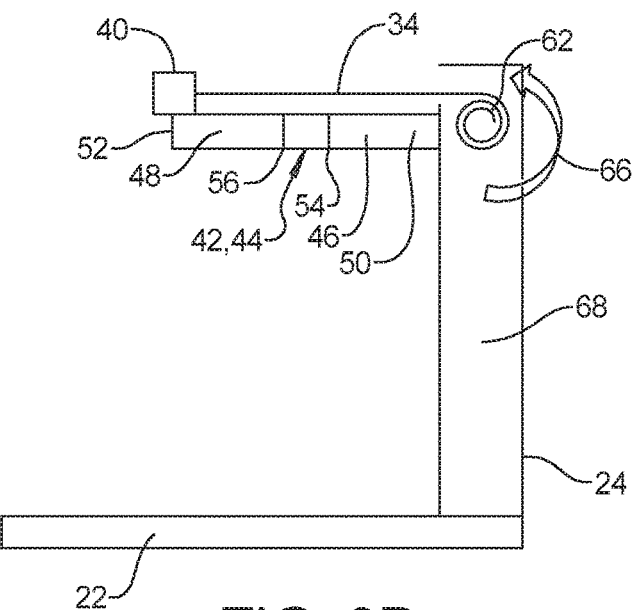
FIG. 3B is a schematic side view of the automotive truck bed having a retractable aerodynamic panel shown in FIG. 3A.

A first support rail 26 is mounted onto a top edge 28 of the first side wall 16 and a second support rail 30 is mounted onto a top edge 32 of the second side wall 18. A panel 34 is mounted onto the tailgate 24. The panel 34 extends back and forth between a retracted position and a deployed position as indicated by arrow 36. Referring to FIG. 2A and FIG. 2B, when the panel 34 is in the retracted position, the automotive truck cargo bed 14 is substantially open. Referring to FIG. 3A and FIG. 3B, when the panel 34 is in the deployed position, the panel 34 extends across a portion of the automotive truck cargo bed 14 between the top edges 28, 32 of the first and second side walls 16, 18.

Figure 4:
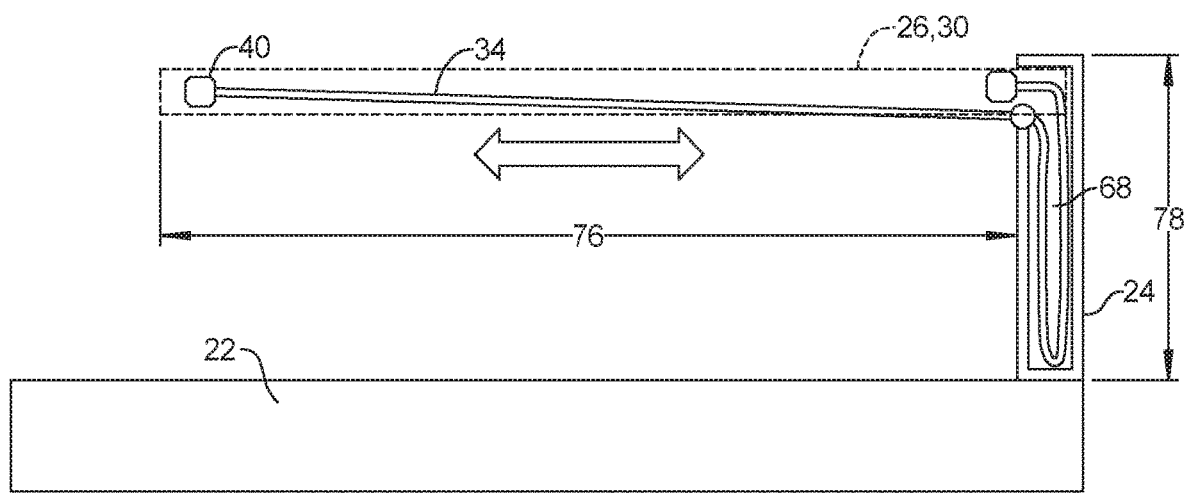
FIG. 4 is a schematic side view of an automotive truck bed having a retractable aerodynamic panel according to an exemplary embodiment.

Referring to FIG. 4, the panel 34 is supported by the first and second support rails 26, 30. A distal edge 38 of the panel 34 includes features 40 that engage the first and second support rails 26, 30 and allow the distal edge 38 of the panel 34 to easily move back and forth between the retracted and deployed positions. The features 40 that support the panel 34 may be any suitable device to provide support for the distal edge 38 of the panel 34 while allowing the distal edge 38 to easily move back and forth within the first and second support rails 26, 30. By way of non-limiting example, the features 40 may be rollers adapted to roll back and forth within a track formed within the first and second support rails 26, 30, or alternatively, the features 40 may be simple slides that are made from a material providing frictional qualities that would allow the features 40 to easily slide back and forth within the first and second support rails 26, 30.

An actuator 42 is mounted to the tailgate 24 and is adapted to selectively extend the panel 34 between the retracted and deployed positions. Referring again to FIG. 2A, FIG. 2B, FIG. 3A, and FIG. 3B, in an exemplary embodiment, the actuator 42 includes at least one folding arm mechanism 44. The folding arm mechanism 44 acts to push the distal edge 38 of the panel 34 from the retracted position to the extended position, and to pull the distal edge 38 of the panel 34 from the extended position to the retracted position. As shown, the actuator 42 includes a pair of folding arm mechanisms 44. One folding arm mechanism 44 acts on each end of the distal edge 38 of the panel 34 to evenly push and pull the distal edge 38 of the panel 34 back and forth between the retracted and deployed positions.

Each folding arm mechanism 44 includes a first arm 46 and a second arm 48. A first distal end 50 of the first arm 46 is pivotally attached to the tailgate 24. A first distal end 52 of the second arm 48 is pivotally attached to the distal edge 38 of the panel 34. The first and second arms 46, 48 are pivotally attached to one another at second distal ends 54, 56 respectively.

When the panel 34 is in the retracted position, as shown in FIG. 2A and FIG. 2B, the first arm 46 of each folding arm mechanism 44 is pivoted substantially parallel to the tailgate 24 and the second arm 48 of each folding arm mechanism 44 is also substantially parallel to the tailgate 24 and immediately adjacent the first arm 46. When the first arms 46 are rotated about the pivotal connection to the tailgate 24, as indicated by arrows 58 and 60, the folding arm mechanisms 44 expand outward and push the distal edge 38 of the panel 34 away from the tailgate 24 toward the deployed position, as shown in FIG. 3A and FIG. 3B.

In an exemplary embodiment, the pivotal connection of the first distal end 50 of the first arm 46 of each folding arm mechanism 44 is adapted to allow pivotal rotation of the first arm 46 about the pivotal connection of the first arm 46 to the tailgate 24 only within a horizontal plane. The pivotal connection of the first distal end 50 of the first arm 46 of each folding arm mechanism 44 maintains horizontal orientation of the folding arm mechanisms 44, whereby when the folding arm mechanisms 44 are extended outward, the panel 34 is held horizontal. In another exemplary embodiment, the first and second support rails 26, 30 are adapted to fully support the weight of the distal edge 38 of the panel 34.

The panel 34 is made from a material that is selectively rigidizable. When the panel 34 is being retracted or deployed, or when the panel 34 is being stowed in the retracted position, the panel 34 is relatively flexible. The panel 34 is able to be rolled or folded onto itself for storage when in the retracted position.

In an exemplary embodiment, the panel 34 is rolled onto a spool 62 when in the retracted position, as shown in FIG. 2B. The spool 62 could be a spring biased spool 62, wherein when the actuator 42 pulls the distal edge 38 of the panel 34 from the deployed position toward the retracted position, the spool 62 automatically winds up the slack in the panel 34, as indicated by arrow 64. When the actuator 42 pushes the distal edge 38 of the panel 34 from the retracted position outward toward the deployed position, the actuator 42 overcomes the spring bias of the spool 62 and unwinds the panel 34 from the spool 62, as indicated by arrow 66. In another exemplary embodiment, the panel 34 is folded into a hollow space 68 within the tailgate 24 when in the retracted position, as shown in FIG. 4.

Figure 5A:
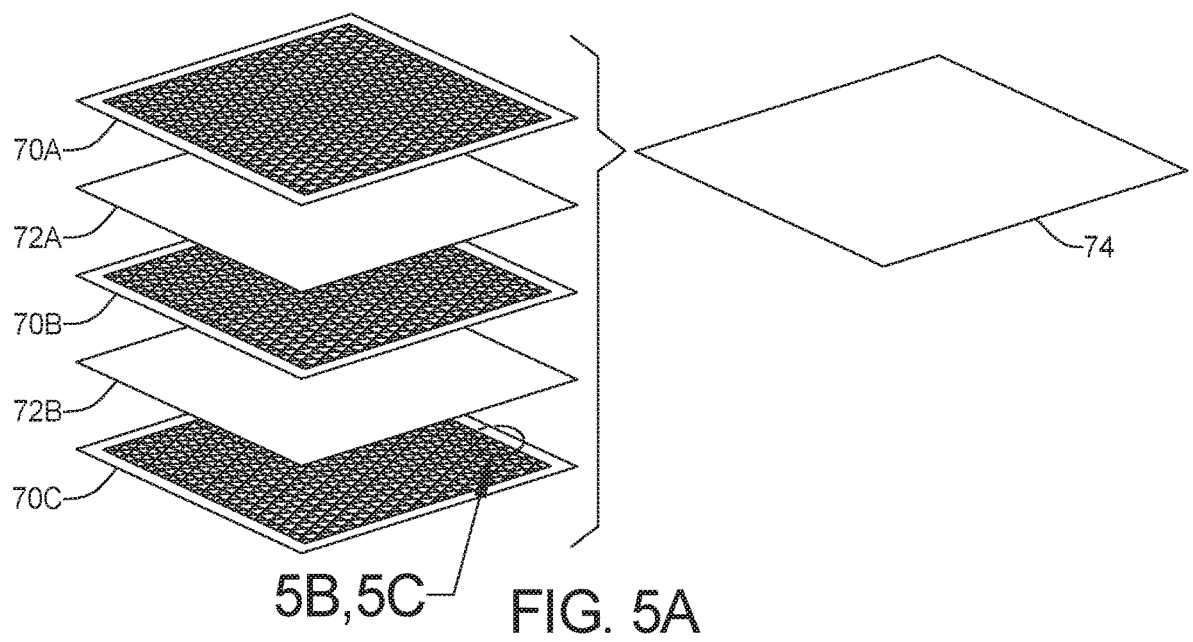
FIG. 5A is a schematic exploded view of the panel for a retractable aerodynamic panel according to an exemplary embodiment.

Referring to FIG. 5A, the panel 34 comprises a first patterned layer 70A, a second patterned layer 70B, and a friction layer 72A positioned between the first and second patterned layers 70A, 70B. It should be understood that there could be any suitable number of alternating patterned layers and frictions layers, wherein a friction layer is positioned between each adjacent pair of patterned layers. As shown in FIG. 5A, three patterned layers 70A, 70B, 70C are layered with two friction layers 72A, 72B.

The patterned layers 70A, 70B, 70C and the friction layers 72A, 72B are enclosed within a vacuum bladder 74. When the pressure within the vacuum bladder 74 is neutral or positive, the vacuum bladder 74 does not put any pressure on the alternating patterned layers 70A, 70B, 70C and friction layers 72A, 72B. When the patterned layers 70A, 70B, 70C and the friction layers 72A, 72B are not pushed together, sliding movement between the patterned layers 70A, 70B, 70C is possible. This allows the panel 34 to be flexible.

When pressure within the vacuum bladder 74 is negative, the vacuum bladder 74 pushes the alternating patterned layers 70A, 70B, 70C and friction layers 72A, 72B against one another and amplifies the frictional engagement between them. The material of the friction layers 72A, 72B is adapted to prevent the patterned layers 70A, 70B, 70C from sliding movement relative to the friction layers 72A, 72B when the vacuum bladder 74 pushes the patterned layers 70A, 70B, 70C and friction layers 72A, 72B against one another. Prevention of sliding movement of the patterned layers 70A, 70B, 70C relative to one another prevents bending or flexing of the panel 34, making the panel 34 substantially rigid.

When the panel 34 is in the retracted position, the vacuum bladder 74 is open to the atmosphere and the panel 34 is flexible. This allows the panel 34 to be rolled onto a spool 62, or folded onto itself within a hollow space 68 within the tailgate 24. This also allows the panel 34 to be extended outward to the deployed position. Once the panel 34 has been deployed, a vacuum is applied to the vacuum bladder 74, creating negative pressure within the vacuum bladder 74 and rigidizing the panel 34. This allows the panel 34 to provide a rigid aerodynamic structure that will withstand the wind experience by the panel 34 when the automotive truck 10 is being driven.

Figure 5B:
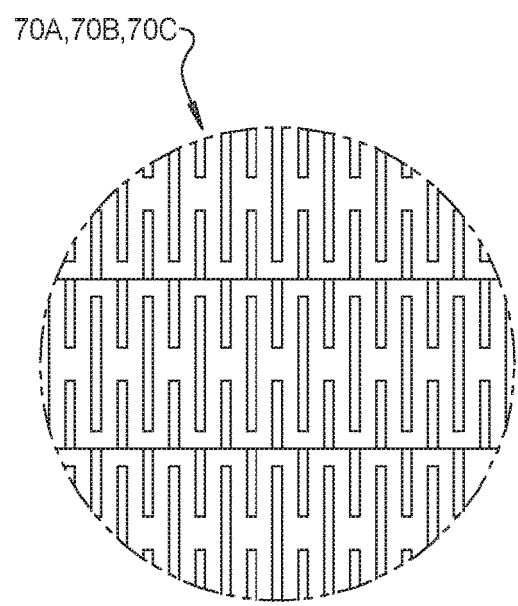
FIG. 5B is an enlarged view of a portion of a patterned layer having a single degree of freedom.
Figure 5C:
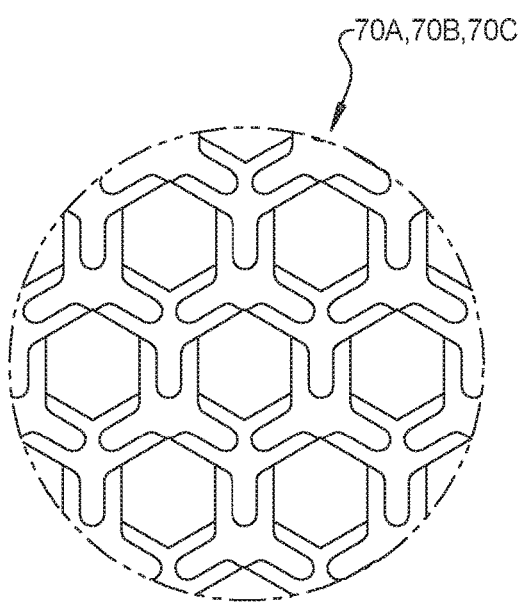
FIG. 5C is an enlarged view of a portion of a patterned layer having multiple degrees of freedom.

The patterned layers 70A, 70B, 70C are designed to provide more or less flexibility. In an exemplary embodiment, the patterned layers 70A, 70B, 70C have a design, as shown in FIG. 5B, that allows flexibility in one direction, providing a single degree of freedom. In another exemplary embodiment, the patterned layers 70A, 70B, 70C have a design, as shown in FIG. 5C, that allows flexibility in more than one direction, providing multiple degrees of freedom.

The distance 76 that the panel 34 extends across the automotive truck cargo bed 14 depends on the specific design of the automotive truck 10. Partial cover of the truck cargo bed 14 provides better aerodynamic drag reduction than a cover that extends completely over the truck cargo bed 14. Precisely how far the panel 34 extends outward from the tailgate 24 across the truck cargo bed 14 will be highly defendant on specific design features of the automotive truck 10. In an exemplary embodiment, the best aerodynamic drag reduction is achieved when the panel 34 extends outward from the tailgate 24 a distance 76 that is substantially equal to the height 78 of the tailgate 24. The panel 34 can be designed to extend outward to a specific deployed position, or alternatively, the panel 34 can be designed to extend fully across the entire automotive truck cargo bed 14. The panel 34 can be selectively deployed to a position that provides maximum aerodynamic drag reduction, or can be fully deployed to cover the entire cargo bed and 14 a payload therein.

In an exemplary embodiment the actuator 42 includes an electric motor 80 to selectively rotate the first arm 46 of each folding arm mechanism 44 to retract or deploy the panel 34. In another exemplary embodiment, the actuator 42 includes a linear actuator 82 that is adapted to selectively rotate the first arm 46 of each folding arm mechanism 44.

Figure 6A:
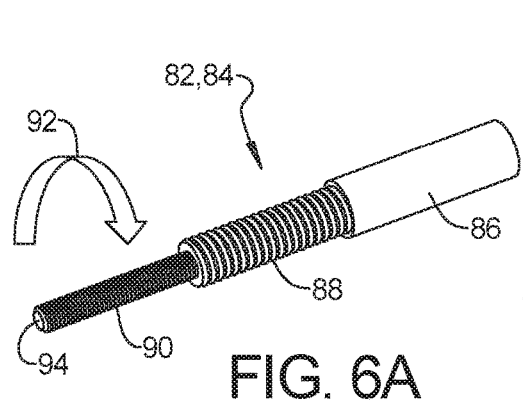
FIG. 6A is a perspective view of a multi-stage threaded linear actuator that is fully extended.
Figure 6B:
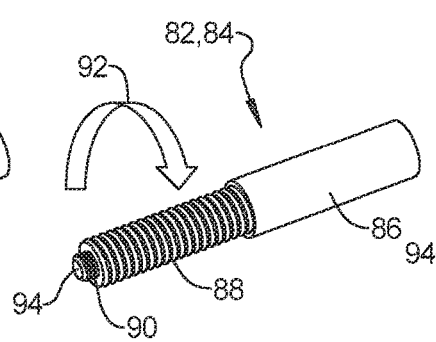
FIG. 6B is a perspective view of a multi-stage threaded linear actuator that is partially extended.
Figure 6C:
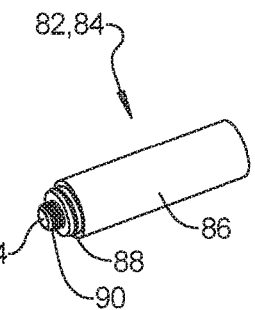
FIG. 6C is a perspective view of a multi-stage threaded linear actuator that is fully retracted.

In one exemplary embodiment, the linear actuator 82 is a multistage threaded rod linear actuator 84, as shown in FIG. 6A, FIG. 6B and FIG. 6C. Referring to FIG. 6C, the multi-stage threaded rod actuator 84 includes a first section 86, a second section 88 threadingly engaged within the first section 86 and a third section 90 threadingly engaged within the second section 88. When the panel 34 is in the retracted position, the third section 90 is threaded completely within the second section 88, and the second section 88 is completely threaded within the first section 86.

Rotation of the first section 86, as indicated by arrow 92, causes the second section 88 to thread outward from the first section 86 as shown in FIG. 6B. When the second section 88 threads fully outward, from the first section 86, the second section 86 bottoms out against the first section 86. Further rotation of the first section 86 causes rotation of both the first and second sections 86, 88 unitarily, causing the third section 90 to thread outward from the second section 88 to the deployed position as shown in FIG. 6A. The distal end 94 of the third section 90 is non-rotatably attached to the first arm 46 of the folding arm mechanism 44. Extension of the second and third sections 88, 90 outward pushes the first arm 46 of the folding arm mechanism 44 outward toward the deployed position.

Figure 7A:
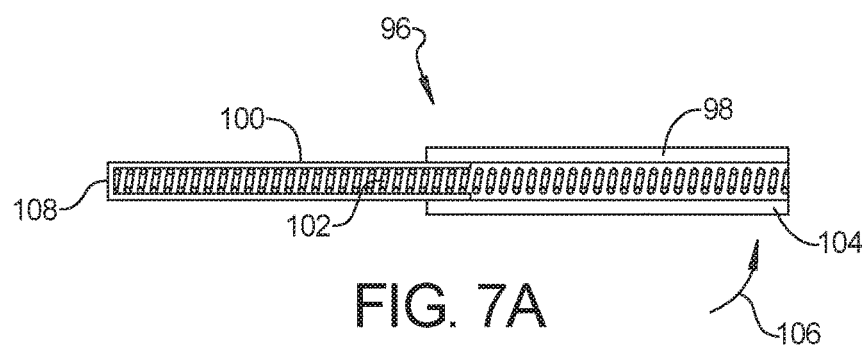
FIG. 7A is a side sectional view of a pneumatically actuated linear actuator that is fully extended.
Figure 7B:
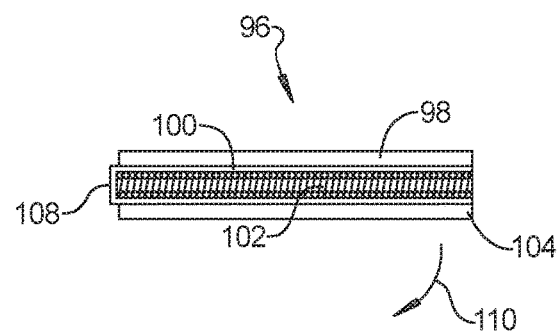
FIG. 7B is a side sectional view of a pneumatically actuated linear actuator that is fully retracted.

Referring to FIG. 7A and FIG. 7B, in another exemplary embodiment, the actuator 42 includes a pneumatically driven linear actuator 96. The pneumatically driven actuator 96 includes a housing 98, an extending rod 100, and a spring 102 biasing the extending rod 100 within the housing 98. When the panel 34 is in the retracted position, the extending rod 100 is retracted fully within the housing 98, as shown in FIG. 7B. When fluid or air pressure is provided within the housing 98 through a valve 104, as indicated by arrow 106, the pressure within the housing 98 will overcome the bias of the spring 102 and push the extending rod 100 outward. The distal end 108 of the extending rod 100 is attached to the first arm 46 of the folding arm mechanism 44. When the extending rod 100 is pushed outward from the housing 98, the extending rod 100 pushes the first arm 46 of the folding arm mechanism 44 outward, thus pushing the panel 34 outward toward the deployed position. When the valve 104 is released, the fluid or air within the housing 98 is released, as indicated by arrow 110, and the spring 102 once again pulls the extending rod 100 back within the housing 98, thereby pulling the first arm 46 of the folding arm mechanism 44 and the panel 34 back to the retracted position.

In an exemplary embodiment, a sensor 112 is mounted within the cargo bed 14. The actuator 42 includes a controller 114 that is adapted to receive input from the sensor 112. The controller 114 includes control logic that automatically extends the panel 34 to the deployed position based on loading within the cargo bed 14. The control logic may be adapted to extend the panel 34 to different deployed positions based on the loading within the cargo bed 14. In another exemplary embodiment, the controller 114 receives information from the automotive truck 10, and may be programmed to automatically deploy the panel 34 or adjust the deployed position of the panel 34 based the speed of the vehicle or other operating parameters. In yet another embodiment, the controller 114 is adapted to receive input directly from the operator of the automotive truck 10, allowing the operator of the automotive truck 10 to selectively deploy the panel 34 and adjust the deployment position of the panel 34 independently of the load within the cargo bed 14 or any other operating parameters that the controller 114 uses to automatically deploy the panel.

A retractable aerodynamic panel 12 for an automotive truck cargo bed 14 of the present disclosure offers several advantages. The panel 34 can be deployed, and the deployed position of the panel 34 can be adjusted as needed to optimize the aerodynamic drag reduction provided by the panel 34 and the panel. This provides better aerodynamic drag reduction that a cover that spans over the truck cargo bed 14 completely. Further, the panel 34 is selectively rigidizable, such that the panel 34 can be flexible enough to roll onto a spool or fold onto itself to be stowed when not in use, and can be selectively rigidized when in the deployed position to provide a solid aerodynamic feature to reduce aerodynamic drag. In addition, the panel 34 can be adapted to automatically extend to the deployed position under pre-determined load conditions, or to be selectively extended to the deployed position by an operator from within the automotive truck.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A retractable aerodynamic panel for an automotive truck cargo bed, comprising:
    a first support rail adapted to be mounted onto a top edge of a first side wall of an automotive truck cargo bed and a second support rail adapted to be mounted onto a top edge of a second side wall of an automotive truck cargo bed;

a panel adapted to be mounted onto a tailgate of the automotive truck cargo bed, the panel adapted to extend between a retracted position, wherein the automotive truck cargo bed is substantially open, and a deployed position, wherein the panel extends outward from the tailgate across a portion of the automotive truck cargo bed between the top edges of the first and second side walls, the panel being supported between the first and second side walls within the first and second support rails, the panel including a first patterned layer, a second patterned layer, and a friction layer positioned between the first and second patterned layers, the first and second patterned layers and the friction layer contained within a vacuum bladder, wherein when negative pressure is selectively applied to the vacuum bladder, the first and second patterned layers are forced into frictional engagement with the friction layer and sliding movement of the first and second patterned layers relative to one another is substantially prevented, causing the panel to be substantially rigid; and an actuator adapted to selectively extend the panel between the retracted and deployed positions.

2. The retractable aerodynamic panel of claim 1, wherein when the panel is in the deployed position, the panel extends a pre-determined distance from the tailgate to provide optimal aerodynamic drag reduction.

3. The retractable aerodynamic panel of claim 2, wherein the panel extends outward from the tailgate a distance that is roughly equal to the height of the tailgate.

4. The retractable aerodynamic panel of claim 1, wherein the panel comprises a plurality of patterned layers and a plurality of friction layers, one friction layer being positioned between each pair of adjacent patterned layers, the plurality of patterned layers and the plurality of friction layers contained within a vacuum bladder, wherein when negative pressure is applied to the vacuum bladder, the plurality of patterned layers are forced into frictional engagement with the plurality of friction layers and sliding movement of the patterned layers relative to one another is prevented, causing the panel to be substantially rigid.

5. The retractable aerodynamic panel of claim 1, wherein the panel is adapted to roll onto a spool when the panel is in the retracted position.

6. The retractable aerodynamic panel of claim 1, wherein the panel is adapted to fold up within a hollow interior of the tailgate when the panel is in the retracted position.

7. The retractable aerodynamic panel of claim 1, wherein the actuator includes at least one folding arm mechanism, the folding arm mechanism having a first arm and a second arm, a first distal end of the first arm being pivotally attached to the tailgate, a first distal end of the second arm being pivotally attached to a distal edge of the panel, the first and second arms being pivotally attached to one another at second distal ends respectively, wherein rotation of the first arm about the pivotal connection of the first arm to the tailgate moves the distal edge of the panel relative to the tailgate.

8. The retractable aerodynamic panel of claim 7, further including one of an electric motor and a linear actuator adapted to selectively rotate the first arm about the pivotal connection of the first arm to the tailgate, the linear actuator being one of a multistage threaded rod linear actuator and a pneumatic driven linear actuator.

9. The retractable aerodynamic panel of claim 7, further including a sensor mounted within the bed and a controller, the controller adapted to receive information from the sensor within the bed and to automatically extend the panel to the deployed position based on loading within the bed.

10. The retractable aerodynamic panel of claim 7, further including a controller, the controller adapted to receive input from an operator and to extend the panel to the deployed position based on input from the operator.

11. A retractable aerodynamic panel for an automotive truck cargo bed, comprising:

a first support rail adapted to be mounted onto a top edge of a first side panel of an automotive truck bed and a second support rail adapted to be mounted onto a top edge of a second side panel of an automotive truck cargo bed;

a panel adapted to be mounted onto a tailgate of the automotive truck cargo bed, the panel adapted to extend between a retracted position, wherein the panel is stowed within a hollow interior of the tailgate and the automotive truck bed is substantially open, and a deployed position, wherein the panel extends outward from the tailgate across a portion of the automotive truck bed between the top edges of the first and second side panels, the panel being supported between the first and second side panels within the first and second support rails;

the panel including a first patterned layer, a second patterned layer, and a friction layer positioned between the first and second patterned layers, the first and second patterned layers and the friction layer contained within a vacuum bladder, wherein when a vacuum is selectively applied to the vacuum bladder, the first and second patterned layers are forced into frictional engagement with the friction layer and sliding movement of the first and second patterned layers relative to one another is prevented, causing the panel to be substantially rigid;

an actuator including at least one folding arm mechanism, the folding arm mechanism having a first arm and a second arm, a first distal end of the first arm being pivotally attached to the tailgate, a first distal end of the second arm being pivotally attached to a distal edge of the panel, the first and second arms being pivotally attached to one another at second distal ends respectively, wherein rotation of the first arm about the pivotal connection of the first arm to the tailgate moves the distal edge of the panel relative to the tailgate to selectively extend the panel between the retracted and deployed positions; and a controller, the controller adapted to receive input from an operator and from sensors within the automotive truck cargo bed and to extend the panel to the deployed position based on the input received.

12. The retractable aerodynamic panel of claim 11, wherein when the panel is in the deployed position, the panel extends a pre-determined distance from the tailgate to provide optimal aerodynamic drag reduction.

13. The retractable aerodynamic panel of claim 12, wherein the panel extends outward from the tailgate a distance that is roughly equal to the height of the tailgate.

14. The retractable aerodynamic panel of claim 11, further including one of an electric motor and a linear actuator adapted to selectively rotate the first arm about the pivotal connection of the first arm to the tailgate, the linear actuator being one of a multi-stage threaded rod linear actuator and a pneumatic driven linear actuator.

15. A cargo bed for an automotive truck, comprising:

a first side wall, a second side wall, a front wall, a bottom, and a tailgate;

a first support rail mounted onto a top edge of the first side wall and a second support rail mounted onto a top edge of the second side wall;

a panel mounted onto the tailgate, the panel adapted to extend between a retracted position, wherein the panel is stowed within a hollow interior of the tailgate and the automotive truck bed is substantially open, and a deployed position, wherein the panel extends outward from the tailgate across a portion of the automotive truck bed between the top edges of the first and second side walls, the panel being supported between the first and second side walls within the first and second support rails;

the panel including a first patterned layer, a second patterned layer, and a friction layer positioned between the first and second patterned layers, the first and second patterned layers and the friction layer contained within a vacuum bladder, wherein when negative pressure is applied to the vacuum bladder, the first and second patterned layers are forced into frictional engagement with the friction layer and sliding movement of the first and second patterned layers relative to one another is substantially prevented, causing the panel to be substantially rigid;

an actuator including at least one folding arm mechanism, the folding arm mechanism having a first arm and a second arm, a first distal end of the first arm being pivotally attached to the tailgate, a first distal end of the second arm being pivotally attached to a distal edge of the panel, the first and second arms being pivotally attached to one another at second distal ends respectively, wherein rotation of the first arm about the pivotal connection of the first arm to the tailgate moves the distal edge of the panel relative to the tailgate to selectively extend the panel between the retracted and deployed positions; and a controller, the controller adapted to receive input from an operator and from sensors within the automotive truck cargo bed and to extend the panel to the deployed position based on input received.

16. The retractable aerodynamic panel of claim 15, wherein when the panel is in the deployed position, the panel extends a pre-determined distance from the tailgate to provide optimal aerodynamic drag reduction.

17. The retractable aerodynamic panel of claim 16, wherein the panel extends outward from the tailgate a distance that is roughly equal to the height of the tailgate.

18. The cargo bed for an automotive truck of claim 15, further including one of an electric motor and a linear actuator adapted to selectively rotate the first arm about the pivotal connection of the first arm to the tailgate, wherein the linear actuator is one of a multi-stage threaded rod linear actuator and a pneumatic driven linear actuator.

19. The cargo bed for an automotive truck of claim 15, further including a sensor mounted within the bed and a controller, the controller adapted to receive information from the sensor within the bed and from an operator, and to automatically extend the panel to the deployed position based on loading within the bed and input from the operator.

* * * * *